UNITED STATES PATENT OFFICE.

PETER H. VANDER WEYDE, OF NEW YORK, N. Y.

MANUFACTURING A ROT-PROOF COVERING FOR UNDERGROUND TELEGRAPH-CABLES.

SPECIFICATION forming part of Letters Patent No. 292,770, dated January 29, 1884.

Application filed April 29, 1882. (No specimens.)

*To all whom it may concern:*

Be it known that I, PETER H. VANDER WEYDE, of the city, county, and State of New York, have invented a new and useful Improvement in the Art of Manufacturing Insulated Underground Wires and Cables for Telegraphic, Telephonic, and other Purposes, of which the following is a description.

The object of my invention is twofold: first, to improve the durability of the insulation of the conducting-wire by the use of inorganic substances possessing excellent non-conducting qualities, and which will not deteriorate by age, as do the organic vegetable compounds hitherto used for this purpose; secondly, to reduce the cost of insulated wires and cables by the use of a cheaper as well as better insulating material and by a simplification of the process of manufacture.

My invention consists in the saturation of a covering of cotton or other equivalent fibrous material braided or spun over the wire or wires with elaterite or mineral resin, found in great abundance in the Territory of Utah, in the United States of America.

In order to increase the tenacity and pliability of the elaterite when cold, I combine therewith from five to ten per cent. (according to the temperature to which it is to be exposed) of bitumen from Trinidad or from Val de Travers, or other equivalent mineral substance adapted to this end, avoiding carefully the use of any substance of recent organic origin, and which has not undergone the test of ages, as is the case with the mineral substances referred to.

In the manufacture of my improved insulated wires or cables each wire—using copper wire or copper-coated wire by preference—is first covered with an envelope of cotton or other absorbent fibrous material, braided, spun, or twisted thereon in the customary manner to about one-eighth of an inch in thickness, (more or less.) The wire so covered is then slowly passed through a melted solution or compound of the Utah elaterite, to which has been added five to ten per cent. of bitumen, the mass being heated to a temperature of about 200° Fahrenheit. The cotton covering has a great affinity for this compound, so that the compound will readily and thoroughly penetrate its fibers. The covered and coated wire is drawn out perpendicularly from the hot solution, so as to secure the economical draining off of the adhering substance, and is led up high enough to permit the outer coat to cool down and become solidified before it is coiled on a suitable drum.

In manufacturing a cable, a number of wires thus coated are laid parallel to each other and unitedly covered with an envelope or sheathing of cotton or equivalent fibrous material. After the united wires have been enveloped in cotton for the second time, the cable is passed through the bath of molten elaterite and bitumen, in manner as above described. After the coating has cooled sufficiently the surface of the cable may be rubbed down to smoothen it, and to close any superficial porosity which may show itself.

In order to secure greater flexibility in the cable, it may be well to give the component wires a slight twist—say one turn in the distance of a foot—although this is not essential.

So complete is the affinity of cotton for the mineral resin that the treatment and coating therewith of each of the separate wires in a cable preparatory to assembling them together may be dispensed with, for the elaterite will quickly and readily permeate the double coating overlaying the wires in the complete cable; but I prefer, nevertheless, for greater surety, to treat the wires separately as set forth before combining them in a cable.

I contemplate the use of ozocerite as an equivalent substitute for elaterite, although the elaterite differs from ozocerite in its color, which is black, in its melting-point, which is higher, and in its specific gravity, which is greater.

What I claim, and wish to secure by Letters Patent, is—

1. As a new article of manufacture, an electrical conductor consisting of a metallic thread inclosed within an envelope of fibrous material permeated or saturated with elaterite or other equivalent pliable inorganic material, substantially as described.

2. The combination, with an envelope of fibrous material inclosing a metallic conducting-wire, of a compound of elaterite or mineral wax and bitumen, made to permeate and saturate the fibrous envelope, substantially in the manner and for the purpose herein set forth.

P. H. VANDER WEYDE.

Witnesses:
J. W. LASJERRE,
E. A. FRASER.